United States Patent
Rakshit et al.

(10) Patent No.: US 12,360,520 B2
(45) Date of Patent: Jul. 15, 2025

(54) IDENTIFYING NATURAL SOLUTIONS TO PROBLEMS

(71) Applicant: INTERNATIONAL BUSINESS MACHINES CORPORATION, Armonk, NY (US)

(72) Inventors: Sarbajit K. Rakshit, Kolkata (IN); Partho Ghosh, Kolkata (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 17/650,898

(22) Filed: Feb. 14, 2022

(65) Prior Publication Data
US 2023/0259110 A1 Aug. 17, 2023

(51) Int. Cl.
G05B 23/02 (2006.01)
(52) U.S. Cl.
CPC .................. G05B 23/0243 (2013.01)
(58) Field of Classification Search
None
See application file for complete search history.

(56) References Cited

U.S. PATENT DOCUMENTS

| | | | |
|---|---|---|---|
| 11,103,800 B1 * | 8/2021 | Roberts | A63H 13/04 |
| 2004/0068351 A1 | 4/2004 | Solomon | |
| 2011/0099130 A1 | 4/2011 | Blumberg | |

FOREIGN PATENT DOCUMENTS

WO 2012119325 A1 9/2012

OTHER PUBLICATIONS

Minsky, Marvin. "Steps toward artificial intelligence." Proceedings of the IRE 49.1 (1961): 8-30. (Year: 1961).*
Zhou, Lei, et al. "Emergency decision making for natural disasters: An overview." International journal of disaster risk reduction 27 (2018): 567-576. (Year: 2018).*
Burghardt, Tilo, and J. Ćalić. "Analysing animal behaviour in wildlife videos using face detection and tracking." IEE Proceedings—Vision, Image and Signal Processing 153.3 (2006): 305-312 (Year: 2006).*
Cid, F., et al. "Imitation system for humanoid robotics heads." FormaMente n. Jan. 2, 2013 Jan. 2013 (2013): 105. (Year: 2013).*
Finn, Chelsea, Ian Goodfellow, and Sergey Levine. "Unsupervised learning for physical interaction through video prediction." Advances in neural information processing systems 29 (2016). (Year: 2016).*
Suzuki, Hidekazu, Hitoshi Nishi, and Seiya Tsuchiya. "Gait learning method for stable motion using quadrupedal robot." Proceedings of SICE Annual Conference 2010. IEEE, 2010. (Year: 2010).*
Parker, Lynne E., Daniela Rus, and Gaurav S. Sukhatme. "Multiple mobile robot systems." Springer handbook of robotics (2016): 1335-1384. (Year: 2016).*

(Continued)

*Primary Examiner* — Carlos R Ortiz Rodriguez
(74) *Attorney, Agent, or Firm* — Stephen R. Yoder (57) ABSTRACT

The present inventive concept provided for a method for identifying a natural solution to solve a problem. The method includes identifying the problem in environmental multimedia of an environment; identifying the natural solution to the identified problem and required capabilities thereof based on a mapping; and generating a machine-based solution based on the natural solution.

18 Claims, 6 Drawing Sheets

(56) References Cited

OTHER PUBLICATIONS

Xiong, Haoyu, et al. "Learning by watching: Physical imitation of manipulation skills from human videos." 2021 IEEE/RSJ International Conference on Intelligent Robots and Systems (IROS). IEEE, 2021. (Year: 2021).*

Brownlee, "A Gentle Introduction to Generative Adversarial Networks (GANs)", https://machinelearningmastery.com/what-are-generative adversarial-ne . . . , Machine Learning Mastery, Jun. 17, 2019, pp. 1-31.

Mell et al., "The NIST Definition of Cloud Computing", National Institute of Standards and Technology, Special Publication 800-145, Sep. 2011, pp. 1-7.

Shu, et al., "Biologically Inspired Design", https://shulab.mie.utoronto.ca/wp-content/uploads/pubs/Journal/2011_ShuEtAl_CIRP_BiologicallyInspiredDesign.pdf, CIRP Annuals—Manufacturing Technology 60 (2011), pp. 673-693.

\* cited by examiner

IDENTIFYING NATURAL SOLUTIONS TO PROBLEMS

BACKGROUND

Exemplary embodiments of the present inventive concept relate to identifying natural solutions, and more particularly to applying identified natural solutions in machine environments.

Across the animal kingdom, animals face a variety of problems in their environment. An animal's implemented solution to problem and corresponding problem-solving behaviours are tailored by natural selection (e.g., instinct, capabilities, natural features of their habitat) and experiential learning. These problem-solving behaviours are innumerous and at times complex, particularly when multiple problems cooccur or a problem involves multiple subproblems. Animal problem-solving behaviours may include, for example, goal-oriented activities (e.g., gathering materials, digging, etc.), use of tools to accomplish goal-oriented activities (e.g., using a stick to retrieve ants from an ant hill, using a stone to open a shell, etc.), interaction with other animals (e.g., cooperation, role assumption, symbiosis, etc.), reactions to external stimuli, and pre-emptive actions.

Different types of animals may encounter a similar or identical problem. They may implement different solutions or even a same general solution to the problem. However, even in the case of a same general solution to a problem, the problem-solving behaviours used to carry out the solution may differ between the different animal types. For example, a bird and a beaver may both face a problem of being without shelter. The solution for each is to build a dwelling; but they may do so by distinct means and in distinct environments. The bird uses its beak to build a bowl-shaped nest from grass, leaves, mud, lichen, yarn, and fur on a tree branch, whereas the beaver uses its paws to build a conical shaped lodging on a river using mud, stones, small trees and branches.

SUMMARY

Exemplary embodiments of the present inventive concept relate to a method, a computer program product, and a system for identifying natural solutions to problems.

According to an exemplary embodiment of the present inventive concept, provided is a method for identifying a natural solution to solve a problem. The method includes identifying the problem in environmental multimedia of an environment; identifying the natural solution to the identified problem and required capabilities thereof based on a mapping; and generating a machine-based solution based on the natural solution.

According to an exemplary embodiment of the present inventive concept, provided is a computer program product for identifying a natural solution to solve a problem. The computer program includes one or more computer-readable storage media and program instructions stored on the one or more computer-readable storage media, the program instructions including a method. The method includes identifying the problem in environmental multimedia of an environment; identifying the natural solution to the identified problem and required capabilities thereof based on a mapping; and generating a machine-based solution based on the natural solution.

According to an exemplary embodiment of the present inventive concept, a computer system is provided for identifying a natural solution to solve a problem. The system includes one or more computer processors, one or more computer-readable storage media, and program instructions stored on the one or more of the computer-readable storage media for execution by at least one of the one or more processors. The program instructions include a method. The method includes identifying the problem in environmental multimedia of an environment; identifying the natural solution to the identified problem and required capabilities thereof based on a mapping; and generating a machine-based solution based on the natural solution.

BRIEF DESCRIPTION OF THE DRAWINGS

The following detailed description, given by way of example and not intended to limit the exemplary embodiments solely thereto, will best be appreciated in conjunction with the accompanying drawings, in which.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION OF THE DRAWINGS

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. It shall be understood that the following detailed description is focused on the distinctive features or elements of the present inventive concept according to various exemplary embodiments.

Presented hereafter are exemplary embodiments of the present inventive concept directed to identifying natural solutions to problems for machine implementation.

Figure 1:
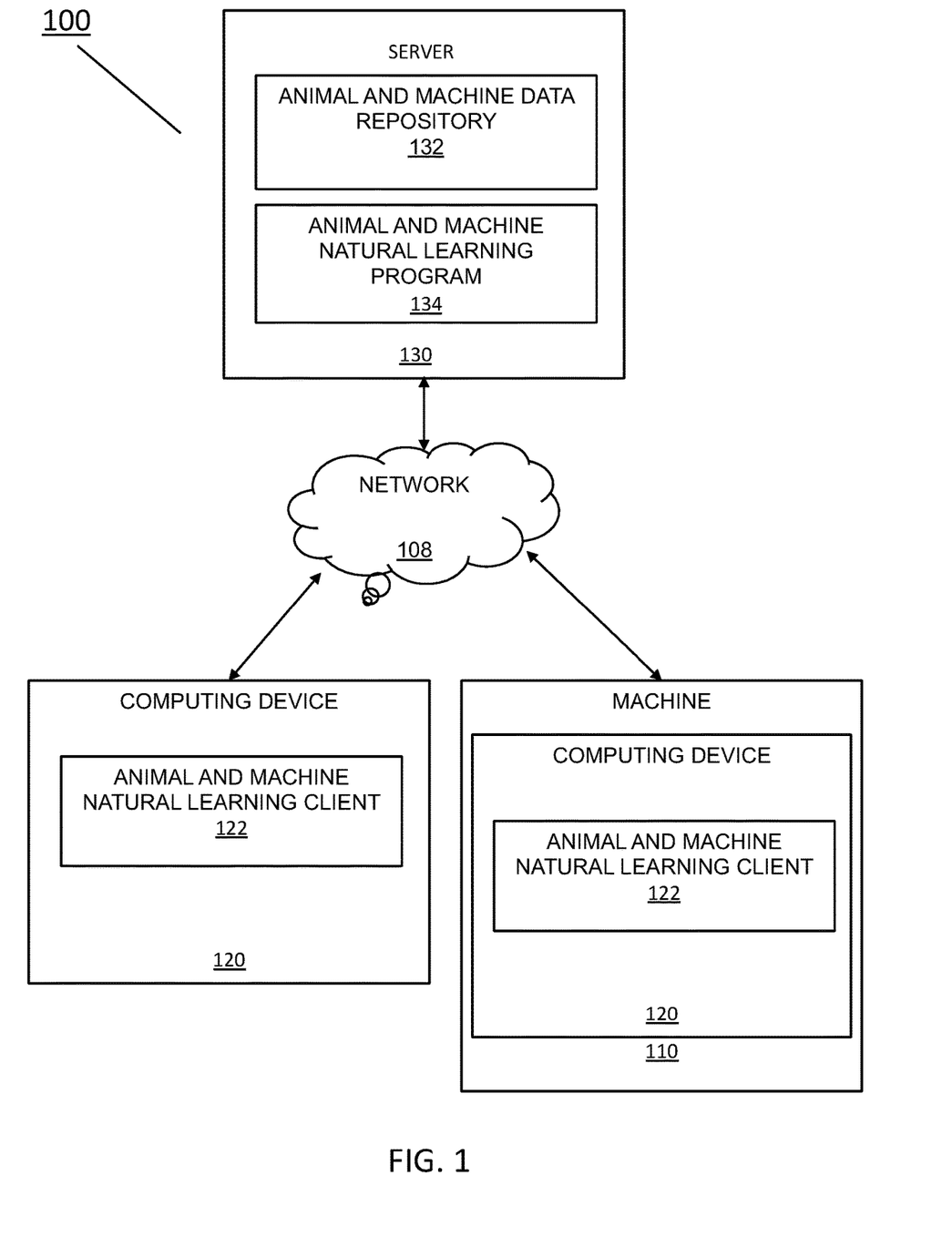
FIG. 1 illustrates a schematic diagram of an animal and machine natural learning system 100, in accordance with an exemplary embodiment of the present inventive concept.

FIG. 1 illustrates a schematic diagram of an animal and machine natural learning system 100, in accordance with an exemplary embodiment of the present inventive concept.

The animal and machine natural learning system 100 may include a network 108, a machine 110 (e.g., a robot), a computing device 120, and an animal and machine natural learning server 130, which may be interconnected via the network 108. Programming and data content may be stored and accessed remotely across one or more servers via the network 108. Alternatively, programming and data may be stored locally on one or more physical computing devices 120 and/or machines 110.

According to the exemplary embodiment of the present inventive concept depicted in FIG. 1, the network 108 may be a communication channel capable of transferring data between connected devices. The network 108 may be the internet, representing a worldwide collection of networks 108 and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. The network 108 may be a Bluetooth network, a Wi-Fi network, or a combination thereof. The network 108 may operate in frequencies including 2.4 GHz and 5 GHz internet, near-field communication, Z-Wave, Zigbee, etc. The network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

The machine 110 may include robots, heavy equipment, vehicles, or miscellaneous computer-based devices, and may be singular or plural. In exemplary embodiments of the present inventive concept, the machine 110 may be capable of physical movement (e.g., ambulating, rolling, treading, flying, swimming, etc.) as well as functionality (e.g., lifting, digging, grasping, utilizing tools, extinguishing, etc.). In exemplary embodiments of the present inventive concept, the machine 110 may be remote controlled, semi-autonomous, or fully autonomous, and may be originally designed for uses other than its use in implementing a machine-based solution in the animal and machine natural learning system 100 (e.g., construction, security, recreation, etc.). In exemplary embodiments of the present inventive concept, the machine 110 may be further equipped with a video camera, microphone, supplies, first aid administration devices, fire suppression systems, and the like. The machine 110 may include a computing device 120 and/or an animal and machine natural learning client 122 (described in further detail forthcoming).

Figure 4:
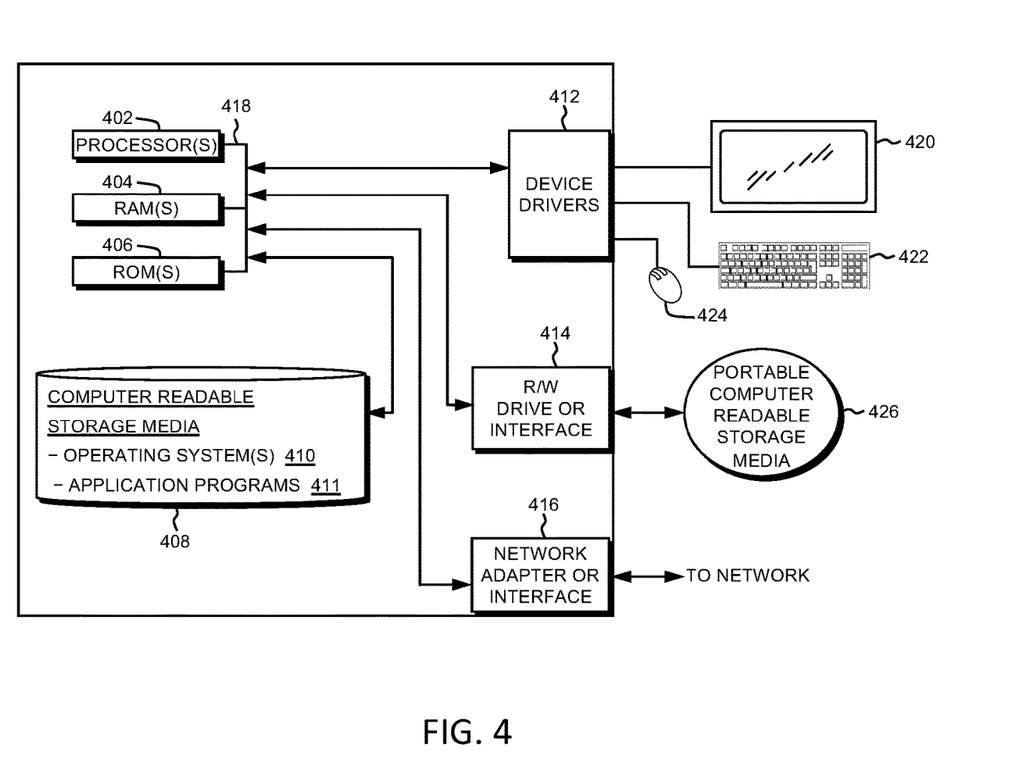
FIG. 4 illustrates a block diagram depicting the hardware components of the animal and machine natural learning system 100 of FIG. 1, in accordance with an exemplary embodiment of the present inventive concept.
Figure 5:
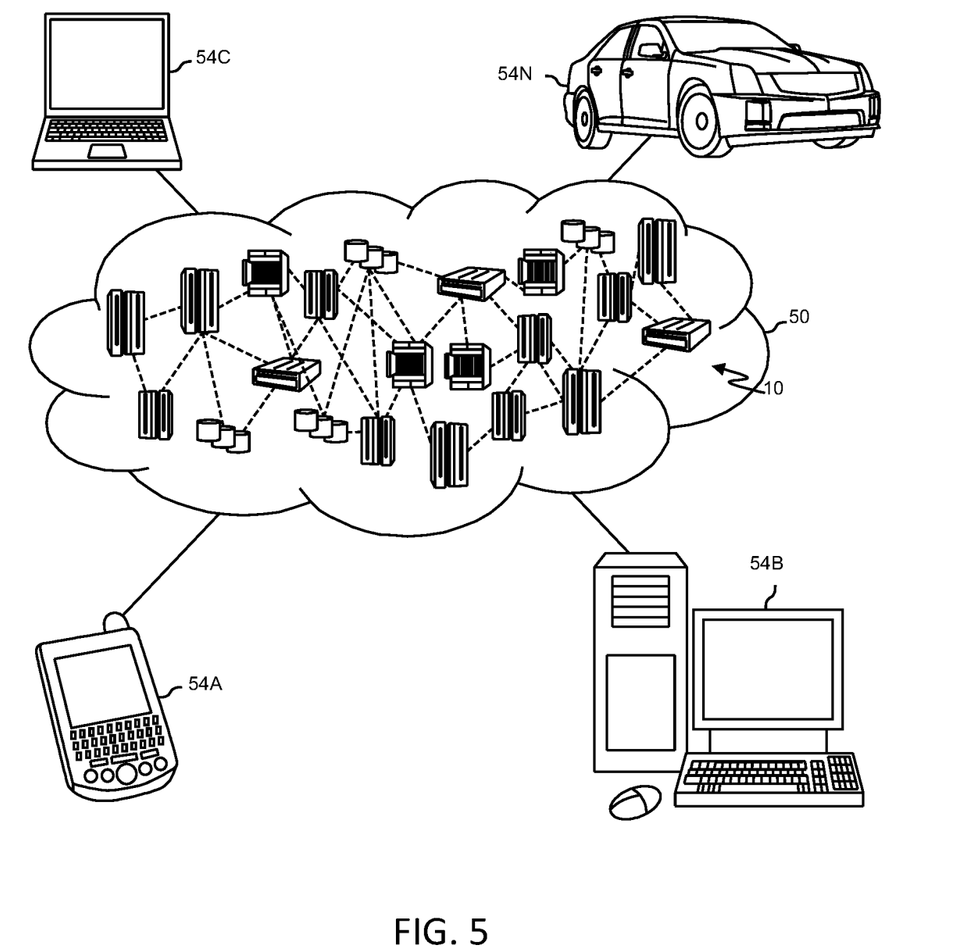
FIG. 5 illustrates a cloud computing environment, in accordance with an exemplary embodiment of the present inventive concept.
Figure 6:
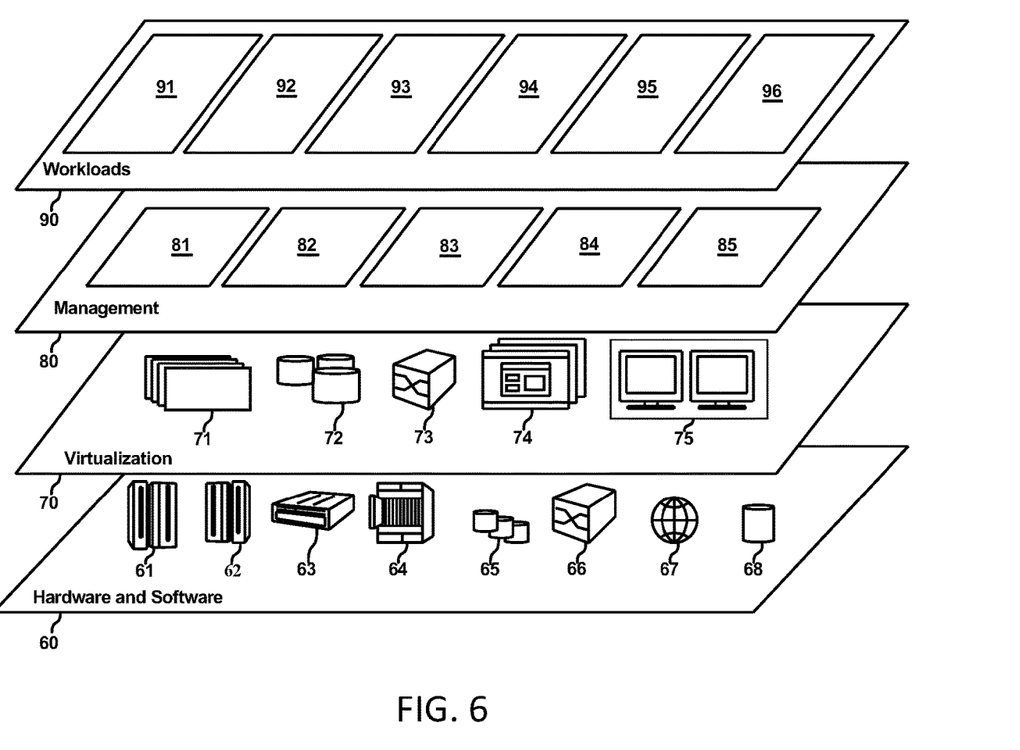
FIG. 6 illustrates abstraction model layers, in accordance with an exemplary embodiment of the present inventive concept.

The machines 110 are described in greater detail as a hardware implementation with reference to FIG. 4, as part of a cloud implementation with reference to FIG. 5, and/or as utilizing functional abstraction layers for processing with reference to FIG. 6.

The computing device 120 may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. Although the computing device 120 is shown as a single device, the computing device 120 may be comprised of a cluster or plurality of computing devices, in a modular manner, etc., working together or working independently. The computing device 120 may include software and/or hardware programs that may be equipped with multimedia recording capabilities (e.g., a video camera and/or microphone, etc.) to collect environmental multimedia and/or animal and machine multimedia data. The animal and machine multimedia data may feature the type of a machine 110 and/or an animal, at least one problem the animal and/or machine 110 encounters, a solution (problem-solving activities), and capabilities (e.g., required capabilities for a given problem). The computing device 120 may also include GPS trackers, heat sensors, infrared cameras, seismic disturbance sensors, etc.

The computing device 120 is described in greater detail as a hardware implementation with reference to FIG. 4, as part of a cloud implementation with reference to FIG. 5, and/or as utilizing functional abstraction layers for processing with reference to FIG. 6.

The computing device 120 may include the animal and machine natural learning client 122. The animal and machine natural learning client 122 may act as a client in a client-server relationship with a server (for example, the animal and machine natural learning server 130). The animal and machine natural learning client 122 may be a software and/or a hardware application that provides a user interface for data exchange with the animal and machine natural learning server 130 and/or other computing devices 120 via the network 108. Moreover, the animal and machine natural learning client 122 may be capable of transferring data between the computing device 120 and other computing devices, such as the server 130 and/or the machine 110, via the network 108. The animal and machine natural learning client 122 may utilize various wired and wireless connection protocols for data transmission and exchange, including Bluetooth, 2.4 GHz and 5 GHz internet, near-field communication, etc.

A user may collect/record/upload multimedia of the environmental multimedia and/or the animal and machine multimedia (images, videos, audio, text, animations) to the animal and machine natural learning server 130 using the animal and machine natural learning client 122. For example, via the animal and machine natural learning client 122, the user may upload animal and machine multimedia to an animal and machine natural learning program 134 for feature extraction, such as video of an animal and/or machine 110 recorded from the video camera of the computing device 120. The animal and machine natural learning client 122 may also provide an interface that enables a user to browse as well as search an animal and machine data repository 132 to retrieve stored information (e.g., mapped features, analogous pairs, and/or corresponding multimedia).

The animal and machine natural learning server 130 may act as a server in a client-server relationship with a client (e.g., the animal and machine natural learning client 122). The animal and machine natural learning server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. Although the animal and machine natural learning server 130 is shown as a single computing device, the present inventive concept is not limited thereto. For example, the animal and machine natural learning server 130 may be comprised of a cluster or plurality of computing devices, in a modular manner, etc., working together or working independently.

The animal and machine natural learning server 130 is described in greater detail as a hardware implementation with reference to FIG. 4, as part of a cloud implementation with reference to FIG. 5, and/or as utilizing functional abstraction layers for processing with reference to FIG. 6.

The animal and machine natural learning server 130 may include the animal and machine data repository 132 and the animal and machine natural learning program 134.

The animal and machine data repository 132 may store the animal and machine multimedia (e.g., collected from the animal and machine natural learning client 122), environmental multimedia, and features extracted therefrom by the animal and machine natural learning program 134 (discussed in further detail with reference to FIG. 2).

The animal and machine natural learning program 134 may collect animal and machine multimedia; extract features (e.g., type, capabilities, problems solved, and solutions) therefrom; map the extracted features and determine analogous pairs; and update (write to) the animal and machine data repository 132 with the mapped features, analogous pairs, and corresponding animal and machine multimedia. The animal and machine natural learning program 134 may also collect and extract features from environmental multimedia. Upon a prompt (such as a user query submitted via the animal and machine natural learning client 122), the animal and machine natural learning program 134 may read from the animal and machine data repository 132 and may transmit the search results to the animal and machine natural learning client 122 via the network 108. The animal and machine natural learning program 134 may be configured to automatically crawl the internet and/or databases to retrieve environmental multimedia and/or animal and machine multimedia. For example, the animal and machine natural learning program 134 may search for specific keywords relating to the environment and/or animals and the machines 110, such as in news websites, specific repositories, video databases, animal knowledge databases, machine 110 databases, etc.

According to an exemplary embodiment of the present inventive concept, the animal and machine natural learning program 134 may engage in autonomous problem identification and solving. The animal and machine natural learning program 134 may identify a problem (e.g., a fire and/or fire alarm) during feature extraction from provided environmental multimedia and/or animal and machine multimedia. Based on the identified problem, the animal and machine natural learning program 134 may apply a model to data from the animal and machine natural learning data repository 132 to identify a solution to the problem, the required capabilities, and at least one analogous pairing of a machine 110. The animal and machine natural learning program 134 may also perform calculations for implementing the machine-based solution.

Figure 2:
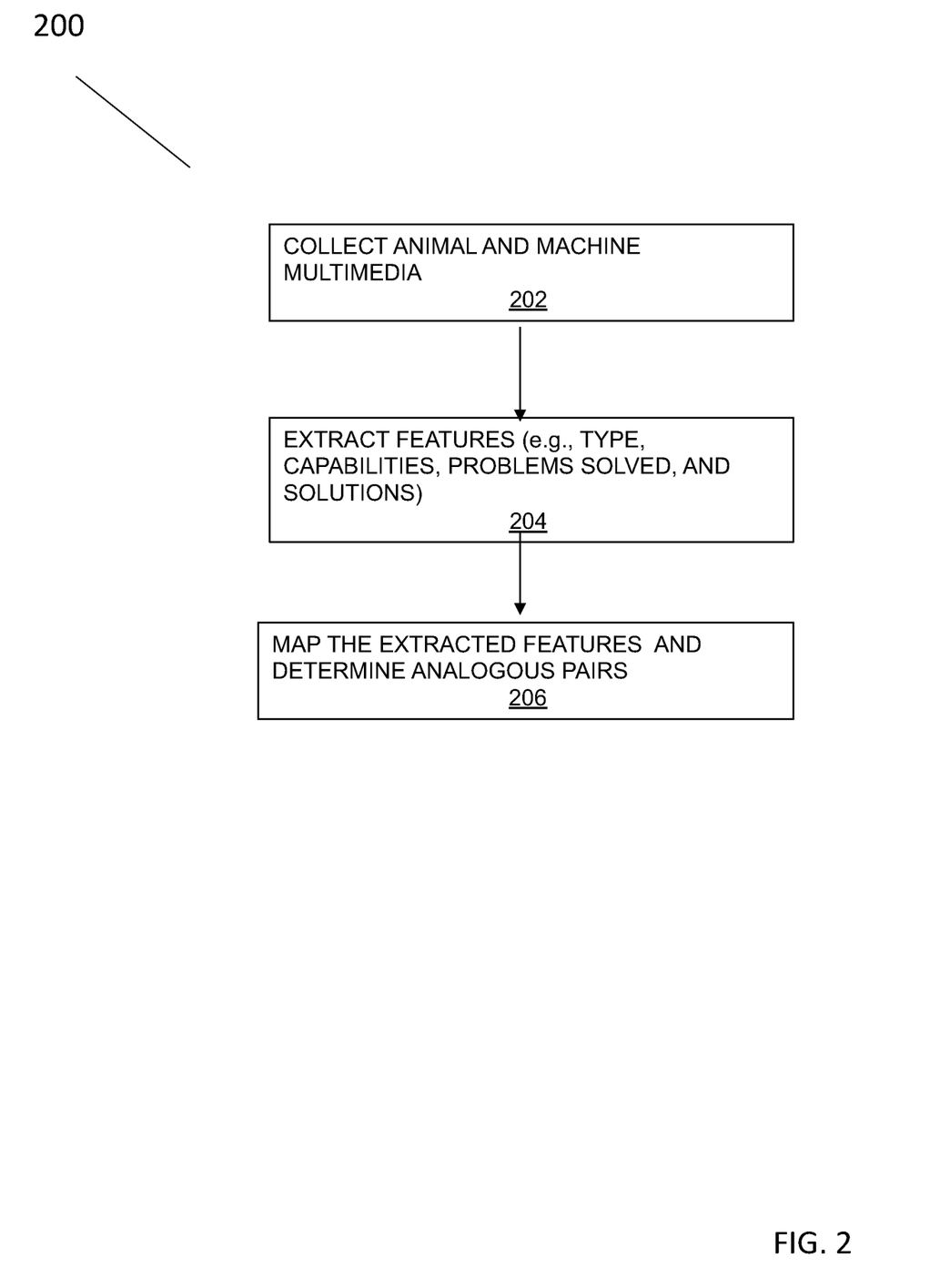
FIG. 2 illustrates a flowchart 200 depicting the process of training an animal and machine natural learning system 100, in accordance with an exemplary embodiment of the present inventive concept.

FIG. 2 illustrates a flowchart depicting the process of training the animal and machine natural learning system 200, in accordance with an exemplary embodiment of the present inventive concept.

The animal and machine natural learning program 134 may collect animal and machine multimedia (step 202). The animal and machine multimedia may include all forms of multimedia (video, image, audio, text, and animation) that depict and/or describe at least one animal and/or machine 110. Types of animal multimedia may include, for example, audio/video/images of animals, titles/descriptions of audio/video clips, zoology databases, wildlife literature, documentaries, doctoral theses, etc. Types of machine 110 multimedia may include, for example, audio/video/images of machines 110, titles/descriptions of audio/video clips, machine databases, doctoral theses, machine specification documentation, machine operation manuals, machine demos, machine illustrations, etc. Animal and machine multimedia may be previously recorded or recorded in real time. The animal and machine multimedia may be collected via the camera and/or microphone of the computing device 120, the user, and/or from the animal and machine natural learning program 134 autonomously crawling the internet for animal and machine multimedia (e.g., continuously, or upon a targeted crawl initiated by the user for specific animals and/or machines 110). Crawling for animal and machine multimedia may involve an autonomous keyword search for sources of animal and machine multimedia that mention/depict animals and/or machines 110.

For example, the animal and machine multimedia collected may be a streaming video of ants uploaded by the animal and machine natural learning client 122 to the animal and machine natural learning program 134. In addition, the animal and machine natural learning program 134 may obtain multimedia relevant to a robot dog from an internet crawl, such as the operation manuals (e.g., describing functionality, capabilities, problems encountered, capacities, etc.), and/or video depicting the robot dog performing various functions.

The animal and machine natural learning program 134 may apply machine learning processes to extract features from the animal and machine multimedia (step 204). Extracted features for each animal and machine 110 may include but are not limited to: type (e.g., animal species/genus/family, machine 110 make/model/serial number, etc.), at least one capability (such as the ability to lift, escort, carry, dig, extend, grasp, extinguish fire, fly, travel by water, etc.), at least one problem encountered (e.g., a gap, fire, need for evacuation, injury to a person, imminent structural collapse, damaged machine 110, flood, collapse, etc.), and at least one general and/or specific solution (e.g., formation of structures, modifications to the surrounding environment, administering medical assistance, coordination with third parties and machines 110, fire suppression, etc.). Sub-problems (segment of a greater overall problem) and sub-solutions (segment of a greater overall solution) may also be extracted. A capability that is essential to perform a solution and/or a sub-solution is referred to herein as a required capability. In exemplary embodiments of the present inventive concept, extracted features may also include physical attributes associated with capabilities (such as appendages, wings, gills, eyes, joint articulations, claws, opposable thumbs, etc.), and the speed/efficiency of solutions and sub-solutions to problems encountered.

Extracted features may be obtained by application of various machine learning processes which may be included in the animal and machine natural learning program 134. Extracting features from textual components of animal and machine multimedia may entail processing by, for example, natural language understanding (NLU) to derive keywords and context. These keywords and context may be related to, for example, a type of animal and/or machine 110, at least one capability, at least one problem and/or sub-problem encountered, and at least one solution and/or sub-solution. With regards to audio or speech, the animal and machine natural learning program 134 may first transcribe speech to text and then perform the NLU. Extracting features from visual components of animal and machine multimedia (e.g., video, images, animations, and/or graphs) may entail, for example, graphic classification by a convolutional neural network (CNN). The CNN may identify a type of animal and/or machine 110 from a video or image and may extract other features such as at least one capability, at least one problem and/or sub-problem, and at least one solution and/or sub-solution. The CNN may identify, for example, bodies, limbs/appendages, movements, formations, etc. of one or more animals and/or the machines 110 which may relate to type and/or capabilities. The CNN may also identify a quantity of animals and/or machines 110, as well as relative positions and/or interactions.

For example, the extracted features from the video of ants may include the animal type (ants), number of limbs (6), number of ants (12 units), a problem (a gap), the solution (bridge formation) and required capabilities (linking, jumping, lifting, grabbing, carrying, etc.).

A classification model may be trained to extract features from animal and machine multimedia.

According to an exemplary embodiment of the present inventive concept, the classification model may be configured by supervised learning. For example, an animal or machine specialist may manually label features in animal and machine multimedia and a classification model may be trained therefrom. The animal or machine specialist may label features in relevant literature, written transcript, video, audio, and/or speech and may upload the labelled features and the corresponding animal and machine multimedia to the animal and machine natural learning program 134. The animal and machine natural learning program 134 may employ pattern matching to detect multimedia patterns associated with the labelled features.

For example, an animal behavior expert may label features in the video depicting ants (type), a problem (gap), a solution (bridge formation), required capabilities to perform the solution (linking, jumping, grasping, lifting, carrying), and the corresponding raw video to the animal and machine natural learning program 134 to train the classification model. Subsequent video and/or images submitted to the classification model exhibiting pattern matched data (e.g., ants forming bridges across a gap) will have the previously labelled features extracted.

According to an exemplary embodiment of the present inventive concept, the classification model may be generated in an unsupervised learning process using the animal and machine multimedia. The animal and machine natural learning program 134 may crawl the internet for videos accompanied by explanatory text and/or descriptive audio and extract features based thereon. For example, the animal and machine natural learning program 134 may find an article on the internet describing ants performing a bridge formation to cross a gap having an embedded video or link depicting the same. The animal and machine natural learning program 134 may identify patterns in the video data using the CNN and may apply the NLU to the textual components of the article and video description. Thus, the animal and machine natural learning program 134 may autonomously determine extracted features.

The animal and machine natural learning program 134 may map the extracted features and determine analogous pairs (step 206). Although the mapping in this step is described with respect to the specific extracted features of problems, solutions, and capabilities, mapping features may further include other extracted features (e.g., the physical attributes used to perform the capabilities, etc.). The problem extracted from animal multimedia for a particular animal may be mapped to one or more performed solutions, and the one or more solutions may be mapped to one or more required capabilities therefor from among a gamut of the animal's capabilities mapped to the animal. The problem extracted from machine multimedia for a particular machine 110 may be mapped to one or more performed solutions, and the one or more solutions may be mapped to one or more required capabilities therefor from among a gamut of capabilities of the machine 110 mapped to the machine 110. The animal multimedia extracted problems, solutions, and required capabilities may be mapped to corresponding extracted features of at least one machine 110. An analogous pair of an animal and machine 110 may be determined when, for a particular problem/solution mapped to an animal, a counterpart machine 110 possesses all the required capabilities to implement the solution—even if the machine 110 is not previously known to be used for this problem. Each solution may have general and specific require capabilities. The animal and machine natural learning program 134 may then update the animal and machine data repository 132 with the mapped extracted features, analogous pair for each problem and/or corresponding animal and machine multimedia. The keywords associated with a problem and/or solution may be associated with synonyms and/or related phrases to enable easier retrieval.

For example, the animal and machine natural learning program 134 may map the gap (problem) encountered by the ants to their bridge formation (the solution) across the gap. The general required capabilities for bridge formation involve the broad ability to link units, whereas the specific required capabilities involve jumping, lifting, grabbing, and carrying. The required capabilities for the bridge formation may be further mapped to the capabilities mutually held by machines 110. In this case, robot snakes may have the general required capability of linking (e.g., interlocking end-to-end) and robot dogs may have the specific capabilities. The animal and machine data repository 132 may be updated to include robot dogs/ants and robot snakes/ants as analogous pairs given the problem of a gap.

According to an exemplary embodiment of the present inventive concept, the plausible retrofit capabilities of a machine 110 may be mapped as tentative required capabilities and designated as such. As will be described in greater detail forthcoming, an environment may have multiple problems and/or sub-problems which may have multiple solutions and/or sub-solutions, respectively, each with different required capabilities. Consequently, different analogous pairs of an animal and a machine 110 may exist for each solution and/or sub-solution.

Figure 3:
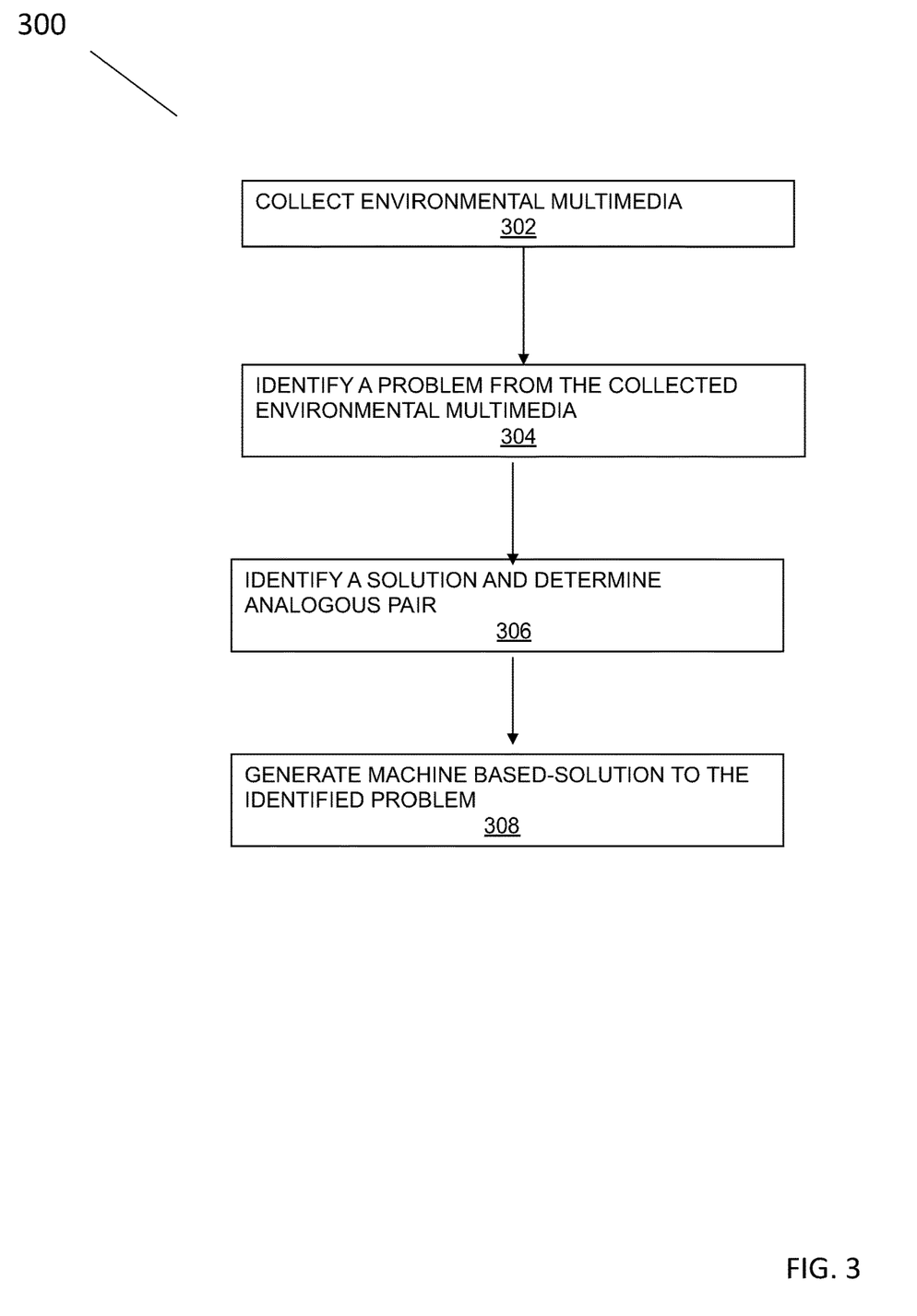
FIG. 3 illustrates a flowchart 300 depicting the process of the animal and machine natural learning system 100 identifying natural solutions to problems using animal and machine natural learning, in accordance with an exemplary embodiment of the present inventive concept.

FIG. 3 illustrates a flowchart 300 depicting the operations of the animal and machine natural learning program 134 in identifying natural solutions to problems, in accordance with an exemplary embodiment of the present inventive concept.

The animal and machine natural learning program 134 may collect environmental multimedia (step 302). The collection of environmental multimedia may be initiated by the user, triggered by an event, or continuous. Environmental multimedia may overlap animal and machine multimedia. The environmental multimedia may be collected on-scene (e.g., IoT feed of a local machine 110) and/or collected over the network 108 (e.g., during an internet crawl, video of an emergent situation, emergency broadcast, radio discussion, emergency dispatch call, etc.). Detection of a problem related to an environmental abnormality (e.g., elevated heat, smoke, seismic disturbance, unusually loud noise for the environment, etc.) by a local machine 110 may serve as a triggering event to initiate environmental multimedia collection. Additionally, after the environmental multimedia collection has been initiated, the animal and machine natural learning program 134 may further crawl the internet for relevant contextual environmental multimedia (e.g., local noise ordinances, maps, geological features, etc.).

For example, a machine 110 may be situated near a bridge. The machine 110 may suddenly detect seismic activity and a loud sound prompting environmental multimedia collection. The animal and machine natural learning program 134 may also search for emergency broadcasts in the area to corroborate an earthquake or for independent identification. From the seismic activity and/or an emergency broadcast analysis, the occurrence of an earthquake is detected. The machine 110 may thus be prompted by the animal and machine natural learning program 134 to begin collecting environmental multimedia on-scene. Alternatively, audio/video from a nearby computer device (e.g., a traffic camera) may be accessed over the network 108 to collect environmental multimedia.

The animal and machine natural learning program 134 may identify a problem from the collected environmental multimedia (step 304). The animal and machine natural learning program 134 may extract at least one problem (e.g., a gap, flood, fire, tornado, construction, distressed persons, collapsed infrastructure, etc.) from the environmental multimedia using machine learning techniques (e.g., CNN, NLU, etc.). However, the present inventive concept is not limited thereto. For example, the user may manually input an actual or predicted problem without necessitating environmental multimedia collection and analysis. The problem and/or sub-problems may be extracted using the classification model of the animal and machine natural learning program 134. However, the present inventive concept is not limited thereto. For example, an independent and more expansive problem detection model may also be referenced which includes features beyond those encountered by an animal and/or machine 110. In addition, the context attending objects of interest (such as a person flailing in the water or a car teetering on a collapsed bridge) may inform the identification of problems (e.g., the actionable relevance of a flood or gap) or may represent distinct problems. Objects of interest may be extracted from the environmental multimedia via application of the same or different model from the animal and machine multimedia and/or the more expansive problem detection model. Objects of interest may include, for example, persons, terrain features (e.g., a body of water, boulders, cliffs, etc.), adjacent structures (e.g., landmarks, buildings, infrastructure, etc.), debris, and potentially useful objects in implementing the machine-based solution (e.g., a sprinkler system, a pole for anchoring, a fire hydrant, etc.). Additionally, if available, video/audio of an environment before and after a known or suspected event may be compared with recent video/audio of the environment to facilitate accurate problem identification (e.g., a demolished building may avoid false identification as a problem after an earthquake based on comparison of prior/recent video).

For example, using the CNN, the animal and machine natural learning program 134 may identify a horizontal gap in the collapsed bridge as a problem with actionable relevance due to stranded persons. However, an additional problem involving a vertical gap with actionable relevance may be identified owing to victims stranded below in a body of water.

The animal and machine natural learning program 134 may identify a solution to the identified problem based on mapping and retrieve an analogous pair (step 306). The animal and machine natural learning program 134 may search the animal and machine data repository 132 for the identified problem (and/or sub-problems) and retrieve at least one mapped potential solution (and/or sub-solution). If multiple solutions and/or sub-solutions to the identified problem are mapped, the animal and machine natural learning program 134 may allow the user to select the solution and/or sub-solutions, or the animal and machine natural learning program 134 may automatically select the solution and/or sub-solutions based on respective analogous pair suitability. The automatic selection of a suitable analogous pair from among competing analogous pairs may involve various factors. These factors may include preparatory calculations involving physics (e.g., distances, weights, capacities, integrity and/or dimensions of objects of interest, machine 110 capacities, implications of objects of interest to the machine-based solution, required timing of machine-based solutions and/or sub-solutions, etc.), comparison of the confidence scores for analogous pairs (historical success of a constituent machine 110 in an analogous pair in solving the identified problem), availability of the machine(s) 110 and/or retrofit upgrades to deficiencies in a temporal and/or spatial radius based on an inventory or database lookup, the machine 110 simultaneously possessing required capabilities for multiple identified problems and/or sub-problems, and other machine 110 attributes (such as pollutant output, safety profile, and noise). The preparatory calculations may be performed on the environmental multimedia. These preparatory calculations may include determined distances and weights of objects of interest, weather conditions affecting machine-based solutions, impact of concurrent problems on solution implementation (e.g., a fire on a collapsed bridge) and an estimated time span to successfully perform a solution and/or sub-solution.

For example, since the horizontal gap stranding victims is identified as one problem, the animal and machine natural learning program 134 may reference the animal and machine data repository 132 and identify the ant bridge as a solution to the horizontal gap. The ant bridge over the horizontal gap requires the capability of linkage (general) and/or jumping, grasping, carrying (specific). Both robot dogs and robot snakes have the required gap bridging capabilities in the abstract. Thus, robot dogs/ants and robot snakes/ants may be analogous pair candidates to bridge the gap. However, based on preparatory calculations, the linked robot snakes would provide insufficient surface area for stranded victims to cross horizontally between bridge ends. Thus, robot dogs are instead selected as the analogous pair to bridge the horizontal gap and 3 units are determined to provide adequate length across the collapsed bridge. The other identified problem of the vertical gap to the water below either bridge end also requires addressing. Robot dogs cannot bridge effectively in the vertical direction and there is no feasible retrofit, however the robot snakes can. Based on preparatory calculations, 8 robot snakes provide adequate height and also have the capacity to support the weight of the stranded victims climbing vertically to safety (provided an anchor is available).

The animal and machine natural learning program 134 may generate a machine-based solution to the identified problem (step 308). Multiple problems may be ranked in order of the urgency of implementation (e.g., a collapsed bridge with injured pedestrians may take priority over a construction project). When multiple machines 110 are required to implement a same or multiple solutions and/or sub-solutions, roles, timing of actions, and positions may be assigned. GPS tracker positions of the machines 110 and/or multimedia may be used to delegate tasks and ensure proper solution implementation. The machines 110 may be instructed to cooperate or perform solutions in parallel without interference. In the case of multiple solutions and/or sub-solutions, the animal and machine natural learning program 134 may attempt to combine them when feasible and efficient. The machines 110 may be of different types. Identical machines 110 may be retrofit differently. The machine-based solution to the identified problem may then be generated by a written description to the user, an audible explanation, a simulation, and/or implementation/upgrade instructions to at least one machine 110 to perform the machine-based solution and/or sub-solutions. The implementation instructions may be communicated to the computing device 120 of the machine 110 over the network 108 and may include directives to the multiple machines 110.

For example, the animal and machine natural learning program 134 may assign roles to the 3 robot dogs (front, middle, back) to implement the bridge solution across the horizontal gap of the collapsed bridge. Shortly thereafter, the 8 robot snakes may be instructed to link and anchor (e.g., coil) the tail or head region to a fixed point (e.g., a front robot dog) before dropping off a collapsed bridge end to reach the stranded victims in the water.

According to an exemplary embodiment of the present inventive concept, the animal and machine natural learning program 134 may use the CNN to analyse animal multimedia and implement a machine-based solution using substantially identical actions. For example, the robot dogs may be instructed to replicate a substantially similar method (e.g., number of units, movements, etc.) and three-dimensional structure of a cylindrical ant bridge formation across the gap. The animal and machine natural learning program 134 may modify and generalize the precise implementation based on preparatory calculations (e.g., a calculated proportionate length of the collapsed bridge gap relative to the robot dog's length may permit fewer units to be used than in the ant bridge formation while maintaining a general structure).

According to an exemplary embodiment of the present inventive concept, a generative adversarial network (GAN) may be used to generate an artificial, visualized solution (e.g., photo or video) of a machine-based solution to the identified problem.

GANs are a means of training a generative model by framing the problem as a supervised learning problem with two sub-models: the generator model trained to generate new examples, and a discriminator model that tries to classify examples as either real (from the domain) or fake (generated). The two models are trained together in a zero-sum game, adversarial, until the discriminator model is fooled about half the time, meaning the generator model is generating plausible examples.

The artificial visualized solution may depict at least one machine 110 and/or animal implementing the solution. According to an exemplary embodiment of the present inventive concept, the GAN may first produce a visualization of the analogous animal solving the identified problem. The visualized solution of a counterpart machine 110 solving the identified problem may then be generated, for example, by replacing the vector associated with the animal corpus in the visualization of the animal solution with a vector associated with the analogous machine 110 structure. The vectors associated with the capabilities may also be substituted to reflect realistic machine 110 movement. The discriminator model component may be the classification model trained using the extracted features, and the generator model component may produce generated examples given similar and/or analogous inputs. Thus, the user can visualize how the problem is solved.

FIG. 4 illustrates a block diagram depicting the hardware components of the animal and machine natural learning system 100 of FIG. 1, in accordance with an exemplary embodiment of the present inventive concept.

It should be appreciated that FIG. 4 provides only an illustration of one implementation and does not imply any limitations with regard to the environments in which different embodiments may be implemented. Many modifications to the depicted environment may be made.

Devices used herein may include one or more processors 402, one or more computer-readable RAMs 404, one or more computer-readable ROMs 306, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 414 to read from and write to one or more portable computer readable storage media 426. Application programs 411 on said devices may be stored on one or more of the portable computer readable storage media 426, read via the respective RAY drive or interface 414 and loaded into the respective computer readable storage media 408.

Devices used herein may also include a network adapter or interface 416, such as a TCP/IP adapter card or wireless communication adapter (such as a 4G wireless communication adapter using OFDMA technology). Application programs 411 on said computing devices may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Devices used herein may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

It is to be understood that although this disclosure includes a detailed description on cloud computing, implementation of the teachings recited herein are not limited to a cloud computing environment. Rather, the exemplary embodiments of the present inventive concept are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 illustrates a cloud computing environment, in accordance with an exemplary embodiment of the present inventive concept.

As shown, cloud computing environment 50 may include one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

FIG. 5 illustrates abstraction model layers, in accordance with an exemplary embodiment of the present inventive concept.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural solution processing 96.

The exemplary embodiments of the present inventive concept may be a system, a method, and/or a computer program product at any possible technical detail level of integration. The computer program product may include a computer readable storage medium (or media) having computer readable program instructions thereon for causing a processor to carry out aspects of the present inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present inventive concept.

Aspects of the present inventive concept are described herein with reference to flowchart illustrations and/or block diagrams of methods, apparatus (systems), and computer program products according to exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

What is claimed is:

1. A method for identifying a natural solution to solve a machine problem, the method comprising:
    identifying a machine problem in an environmental multimedia of a machine environment including machines, the machine problem being an environmental abnormality in the machine environment;
    identifying, in an animal multimedia of a natural environment, a set of natural problems and corresponding natural solutions performed by animals;
    determining a set of animal-machine pairs based on physical appendages of the animals and analogous physical appendages of the machines;
    identifying, for a first animal performing a first natural solution, a corresponding machine to perform a machine solution to the machine problem, the corresponding machine identified with reference to the physical appendages of the first animal and the determined animal-machine pairs;
    identifying required capabilities of the natural solution based on a mapping of features extracted from the animal multimedia illustrating the first animal performing the first natural solution;
    generating a machine-based solution to the machine problem in the machine environment using the corresponding machine having the required capabilities; and
    automating performance of the machine-based solution using the corresponding machine to resolve the identified machine problem.

2. The method of claim 1, wherein the machine-based solution is performed by at least one machine retrofit with the required capabilities.

3. The method of claim 2, further comprising:
    identifying the at least one machine retrofit with the required capabilities within a predetermined temporal and spatial threshold of the machine environment containing the machine problem.

4. The method of claim 1, wherein the machine problem includes at least one of natural disaster, hazards, damaged infrastructure, and distressed persons.

5. The method of claim 1, wherein the machine problem comprises a plurality of sub-problems ranked in order of urgency.

6. The method of claim 1, wherein the machine-based solution is performed by at least two machines of different types.

7. The method of claim 6, wherein the at least two machines of different types also have at least one different required capability.

8. The method of claim 1, wherein the machine-based solution includes instructions, and wherein the instructions include delegated roles to each of a plurality of machines to implement the machine-based solution.

9. A computer program product for identifying a natural solution to solve a problem, the computer program product comprising:
    one or more computer-readable storage media; and program instructions stored on the one or more computer-readable storage media which, when executed by a processor, causes the processor to perform a method comprising:

identifying a machine problem in an environmental multimedia of a machine environment including machines, the machine problem being an environmental abnormality in the machine environment;

identifying, in an animal multimedia of a natural environment, a set of natural problems and corresponding natural solutions performed by animals;

determining a set of animal-machine pairs based on physical appendages of the animals and analogous physical appendages of the machines;

identifying, for a first animal performing a first natural solution, a corresponding machine to perform a machine solution to the machine problem, the corresponding machine identified with reference to the physical appendages of the first animal and the determined animal-machine pairs;

identifying required capabilities of the natural solution based on a mapping of features extracted from the animal multimedia illustrating the first animal performing the first natural solution;

generating a machine-based solution to the machine problem in the machine environment using the corresponding machine having the required capabilities; and automating performance of the machine-based solution using the corresponding machine to resolve the identified machine problem.

10. The computer program product of claim 9, wherein the machine-based solution is performed by at least one machine retrofit with the required capabilities.

11. The computer program product of claim 9, wherein the machine problem comprises a plurality of sub-problems ranked in order of urgency.

12. The computer program product of claim 9, wherein the machine-based solution is performed by at least two machines of different types.

13. A computer system for identifying a natural solution to solve a problem, the system comprising:
one or more computer processors,
one or more computer-readable storage media, and
program instructions stored on the one or more of the computer-readable storage media for execution by at least one of the one or more processors, the program instructions causing the at least one of the one or more processors to perform a method comprising:

identifying a machine problem in an environmental multimedia of a machine environment including machines, the machine problem being an environmental abnormality in the machine environment;

identifying, in an animal multimedia of a natural environment, a set of natural problems and corresponding natural solutions performed by animals;

determining a set of animal-machine pairs based on physical appendages of the animals and analogous physical appendages of the machines;

identifying, for a first animal performing a first natural solution, a corresponding machine to perform a machine solution to the machine problem, the corresponding machine identified with reference to the physical appendages of the first animal and the determined animal-machine pairs;

identifying required capabilities of the natural solution based on a mapping of features extracted from the animal multimedia illustrating the first animal performing the first natural solution;

generating a machine-based solution to the machine problem in the machine environment using the corresponding machine having the required capabilities; and automating performance of the machine-based solution using the corresponding machine to resolve the identified machine problem.

14. The computer system of claim 13, wherein the machine-based solution is performed by at least one machine retrofit with the required capabilities.

15. The computer system of claim 14, further comprising:
identifying the at least one machine retrofit with the required capabilities within a predetermined temporal and spatial threshold of the machine environment containing the machine problem.

16. The computer system of claim 13, wherein the machine problem includes at least one of a natural disaster, hazards, damaged infrastructure, and distressed persons.

17. The computer system of claim 13, wherein the machine problem comprises a plurality of sub-problems ranked in order of urgency.

18. The computer system of claim 13, wherein the machine-based solution is performed by at least two machines of different types.

\* \* \* \* \*